United States Patent [19]

Dahlgren

[11] 4,337,136

[45] Jun. 29, 1982

[54] DEVICE FOR PURIFYING WATER

[76] Inventor: Vincent M. F. Dahlgren, 320 Osborne St., Vista, Calif. 92083

[21] Appl. No.: 239,700

[22] Filed: Mar. 2, 1981

[51] Int. Cl.³ .............................................. C25B 11/10
[52] U.S. Cl. .................................. 204/242; 210/169; 210/242.1
[58] Field of Search ................ 210/169, 242; 204/271, 204/149, 242

[56] References Cited

U.S. PATENT DOCUMENTS

| 541,335 | 6/1895 | Salzberger | 204/149 |
|---|---|---|---|
| 614,890 | 11/1898 | Reynolds | 204/149 |
| 2,046,467 | 7/1936 | Krause | 204/149 |
| 2,121,875 | 6/1938 | Kruse et al. | 204/149 |
| 3,092,566 | 6/1963 | Negus | 210/169 |
| 3,598,536 | 8/1971 | Christensen | 210/169 |
| 3,684,460 | 8/1972 | Arneson | 210/169 |
| 3,752,747 | 8/1973 | Treharne et al. | 204/149 |
| 3,792,979 | 2/1974 | Clinton | 210/169 |
| 3,923,632 | 12/1975 | Eibl et al. | 204/149 |
| 4,241,025 | 12/1980 | Grayson et al. | 210/169 |

Primary Examiner—Theodore A. Granger
Attorney, Agent, or Firm—Fred N. Schwend

[57] ABSTRACT

A pair of electrodes formed of silver-copper alloy depend from the bottom wall of a floating container. The latter is arranged to float on the surface of a body of water to be treated and contains a battery which is connected in circuit with the electrodes through a timer switch and a current reversing switch. Passage of a direct current across the electrodes ionizes the water and the silver and copper ions destroy and prevent the growth of bacteria and algae.

2 Claims, 4 Drawing Figures

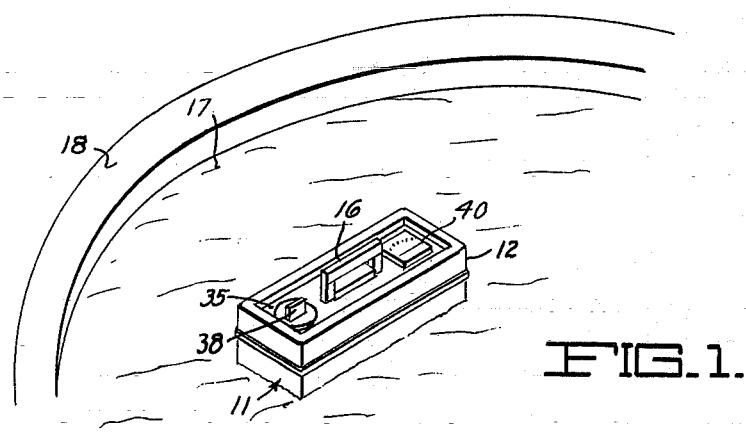
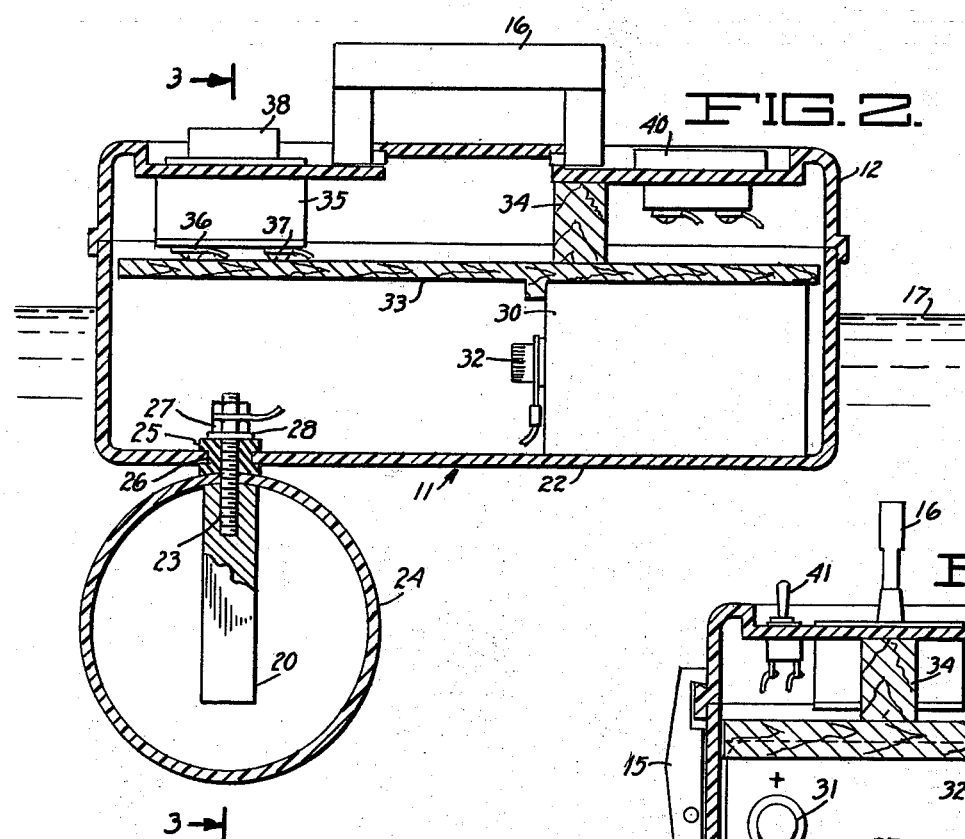
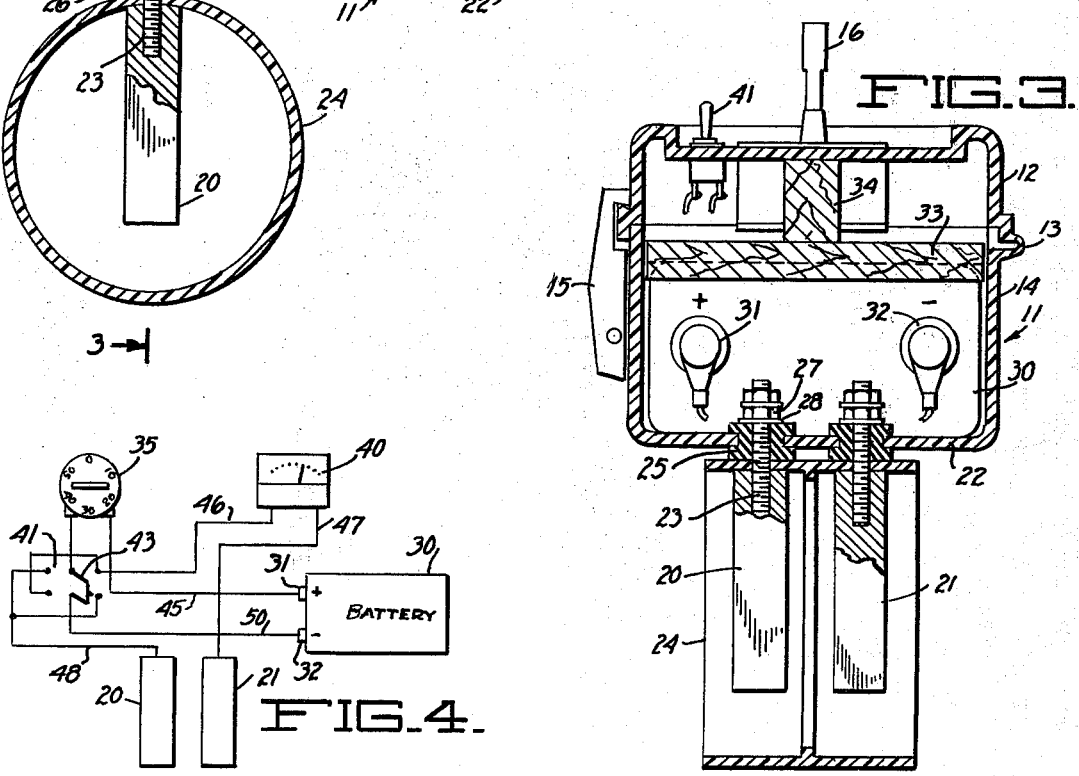

DEVICE FOR PURIFYING WATER

BACKGROUND OF THE INVENTION

1. Field of the Invention

This invention relates to devices for purifying bodies of water, such as swimming pools, spas, etc. to kill and prevent the growth of bacteria, algae, etc.

2. Description of the Prior Art

Swimming pools, spas, and other bathing pools used by humans for bathing and swimming have heretofore generally been purified by periodically adding certain amounts of chlorine to the water. Chlorine is known to be generally satisfactory in killing and preventing the growth of bacteria and algae. However, it has been found that organic materials in water used for bathing tends to react with the chlorine to produce chlorine dioxide, ozone chloramines and bromide chlorine which may be injurious to health and have been found to contain a definite cancer causing agent. Also, when chlorine is added to the water in amounts effective to kill bacteria and algae, it tends to cause reaction to a bather's skin and eye and is distasteful if swallowed.

It has been known for a long time that immersion of certain metals in water produces a purifying effect. For example, silver is effective to kill and prevent growth of bacteria and copper is effective to kill and prevent growth of algae.

Attempts have been made heretofore to utilize silver and copper to purify bathing water but this is not proved successful in most applications, particularly since such metals would have to be spread throughout the body of water or the water would have to be continually passed over such metals in order to produce an effective purifying action.

It therefore becomes the principal object of the present invention to provide a purifying device for a body of water which obviates the necessity for using chlorine or other chemicals to prevent the growth of bacteria and algae.

Another object of the invention is to provide a purifying device utilizing certain metals to purify a relatively large body of water.

Another object of the invention is to provide a purifying device for a body of water, which device is self-contained and requires no permanent installation or exterior power source.

A further object is to provide a purifying device of the above type which is simple, compact, and inexpensive to manufacture and assemble.

SUMMARY OF THE INVENTION

According to the invention, an ionizing device is provided for killing and preventing the growth of bacteria and algae in a body of water, which device is self-contained and comprises a floating container adapted to float on the surface of the water. Spaced electrodes formed of an alloy of silver and copper extend downwardly from a container into the water and are connected in circuit with a battery mounted within the container. Upon completion of the circuit, an electric current extends through the water and between the electrodes and ions of silver and copper are introduced into the water. These ions pass into the water in an extended area surrounding the container.

Normally, water in swimming and bathing pools is recirculated through certain filtering means and thus sets up currents of water which move past the purifying device to carry the silver and copper ions to different portions of the pool. In addition, the device is free to float along with any such currents or to be moved by wind and wave movements to different parts of the pool and thus normally becomes effective to treat all areas of the water within the pool.

A timing device is provided to predetermine the length of time that the purifying device is in operation. Also, current reversing switching means are provided to enable periodic reversal of the polarity of the current passing between the electrodes to reduce erosion of one or the other of the electrodes.

A primary feature of the invention is that it requires no addition or modification of an existing pool and may be easily removed from or replaced in the pool whenever desired.

BRIEF DESCRIPTION OF THE DRAWING

The manner in which the above and other objects of the invention are accomplished will be readily understood on reference to the following specification when read in conjunction with the accompanying drawing, wherein:

FIG. 1 is a perspective view illustrating a preferred form of the purifying device of the present invention and showing the same floating on the surface of a pool of water.

FIG. 2 is a longitudinal sectional view through the purifying device.

FIG. 3 is a transverse sectional view of the device and is taken along the line 3—3 of FIG. 2.

FIG. 4 is a diagram showing the wiring circuit of the device.

DESCRIPTION OF THE PREFERRED EMBODIMENT

Although this invention is susceptible of embodiment in many different forms, there is shown in the drawing and will be described a specific embodiment, with the understanding that the present disclosure is to be considered as an exemplification of the principles of the invention and is not intended to limit the invention to the embodiment illustrated. The scope of the invention will be pointed out in the appended claims.

Referring to the drawing, the purifying device comprises a container 11 of insulating material, preferably plastic, having a cover 12. The cover is hinged at 13 to a side wall 14 of the container and is normally secured in closed condition by a releaseable latch 15 of conventional construction.

A handle 16 is attached to the cover 12 to facilitate lowering or lifting the container to or from a position floating on the surface of a body of water 17 such as is contained in a bathing pool or spa partly indicated at 18.

A pair of spaced elongate metal electrodes 20 and 21 are attached in vertically extending positions to the bottom wall 22 of the container 11 adjacent to the left hand end of the container, as viewed in FIG. 2. Each of the electrodes 20 and 21 is square in cross-section and has a stud 23 threaded centrally therein. The stud 23 extends upwardly through the wall of a cylindrical guard 24, preferably of plastic, and through a rubber grommet 25. The latter has a circumferential groove 26 therearound fitting within a circular hole formed in the bottom wall 22. A nut is threaded on the stud 23 and bears against a washer 28 to compress the grommet between the guard 24 and the washer to hermetically seal the hole in the container wall 22.

Each of the electrodes 20 and 21 is formed of an alloy of intermixed silver and copper, the relation preferably being about ½ percent silver and 99½ percent copper by weight.

A battery 30, preferably of 12 volts potential, is mounted in the container 11 adjacent the right hand end thereof as seen in FIG. 2. Such battery has a pair of terminal posts 31 and 32 of plus and minus polarity, respectively.

A spacer 33 of wood or like material having an upwardly extending block 34 integrally attached thereto is mounted over the battery 30 and is clamped thereagainst by engagement of the cover 12 with the block 34 in order to prevent shifting the battery relative to the container.

A combined switch and timer 35 of conventional construction is mounted on the cover 12 and has terminals 36 and 37 extending into the interior of the container. A knob 38 is rotatably mounted on the timer and, when turned from an initial position to a desired time duration setting, completes a switching circuit between the terminals 36 and 37 and sets into motion a timing mechanism (not shown) which maintains the switch circuit closed for a period of time depending upon the setting of the knob 38. At the end of such period the knob is returned to its initial position and the switching circuit is opened.

Also attached to the cover 12 is a milliammeter 40 and a double pole, double throw reversing toggle switch 41.

The electrodes 20 and 21, timer 35, meter 40, and battery 30 are interconnected by suitable electrical conductors in the manner shown in the wiring diagram of FIG. 4. When the timer 35 is set for a desired period of time and the moveable blade 43 of the reversing switch 41 is thrown to the right of FIG. 4, a circuit will be completed from the battery post 31 through conductor 45, timer 35, switch 41, conductor 46, meter 40, and conductor 47 to the electrode 21. Electrode 20 will be connected through conductor 48, switch 41, and conductor 50 to the battery post 32. Thus, current will pass between the electrodes 20 and 21 to ionize that portion of the water between the electrodes with both copper and silver ions. Such ions will be dispersed throughout the general area surrounding the electrodes. The silver ions will predominately attack any bacteria in the water and the copper ions will predominately attack any algae.

Throwing of the moveable blade 43 of the reversing switch 35 to the left in FIG. 4 will cause a reversal of the current flow across the electrodes 20 and 21. Thus the eroding effect caused by the release of the silver and copper from the electrode having a positive charge applied thereto during ionization may be reversed by throwing the reversing switch 41 to an alternate setting whereby to apply the positive charge to the other electrode.

The eroding effect resulting from the ionization acts predominately on the adjacent faces of the two electrodes 20 and 21 and when such faces have been excessively eroded, the clamp nuts 27 may be released and the electrodes turned to bring different ones of the faces thereof into inwardly facing relation whereby to greatly extend the life of the electrodes.

It will be noted that the weight of the battery 30 at one end of the container 11 substantially balances the weight of the electrodes 20 and 21 at the opposite end to maintain the container in a level floating condition. In such condition, the meter may be readily observed to determine the amount of ionizating current passing between the electrodes 20 and 21.

I claim:

1. A self-contained purifying device for a body of water comprising:
   a container adapted to float on the surface of the water,
   a pair of spaced electrodes depending from said container,
   each of said electrodes comprising an alloy of silver and copper, and
   a direct current electric circuit connected between said electrodes,
   said circuit including a current source contained in said container,
   said circuit causing an ionizing current to pass between said electrodes whereby to destroy bacteria and algae in the water, and
   wherein said alloy comprises about 99½ percent copper and ½ percent silver by weight.

2. A self-contained purifying device for a body of water comprising:
   a container adapted to float on the surface of the water,
   a pair of spaced elongate electrodes depending from said container,
   each of said electrodes comprising an alloy of silver and copper,
   each of said electrodes having a plurality of faces,
   means for securing the upper ends of said electrodes to the bottom of said container,
   said electrodes being rotatably adjustable whereby to present different ones of said faces of one of said electrodes to different ones of said faces of the other of said electrodes, and
   an electric circuit connected between said electrodes,
   said circuit including a battery mounted in said container,
   said circuit causing an ionizing current to pass between said electrodes whereby to destroy bacteria and algae in the water, and
   wherein said alloy comprises about 99½ percent copper and ½ percent silver by weight.

* * * * *